Patented Oct. 17, 1944

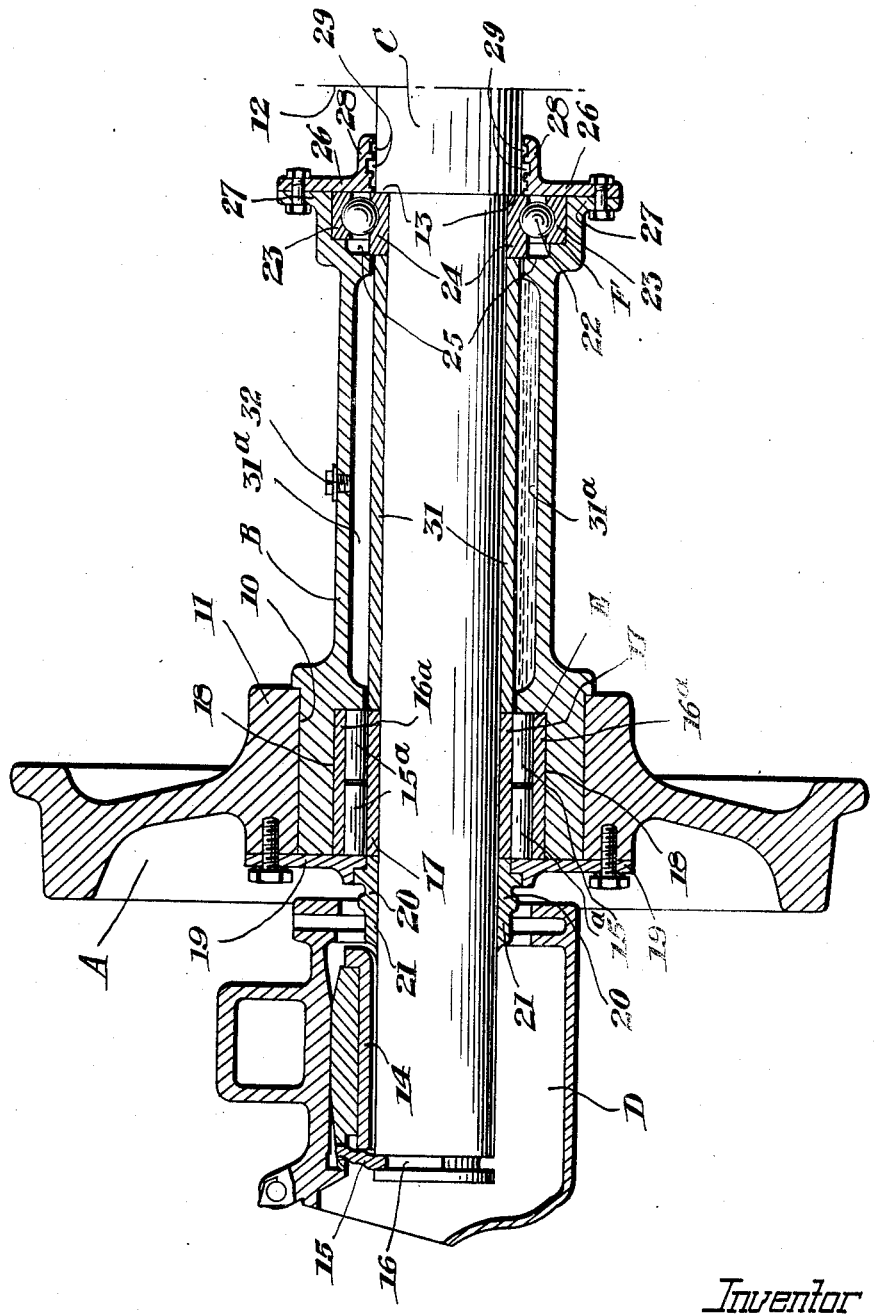

2,360,329

UNITED STATES PATENT OFFICE 2,360,329

ROLLER-BEARING DIFFERENTIAL WHEEL

Joseph Ashmore Cameron, Montreal, Quebec, Canada

Application April 2, 1943, Serial No. 481,621

4 Claims. (Cl. 295—38)

This invention relates to improvements in roller bearing differential wheels for railway vehicles of the type in which a pair of wheels are supported from independently rotatable axle housings having roller and ball bearing support from the axle. The objects of the invention are generally to improve and simplify the construction of such a device, to reduce the rail and rolling friction, and to overcome lateral thrusts accumulated by wheel flanges and car body sway.

In common practice wheels for railway vehicles are mounted on and connected fixedly to an axle which, in rotating, causes undue friction against the rail and a continuous skidding of at least one wheel. In a car truck of four wheels it is known that at least three of the four wheels are skidded to a certain extent during the entire operation. While differential wheels have been proposed, a satisfactory design for such wheel has not been available due to the difficulty of distributing the heavy loads involved.

According to the present invention the wheels are connected to or formed integral with suitable axle housings which are designed to so distribute the loads to the axle as to carry the loads at the required speed. Roller bearings are provided to eliminate rolling friction and thrust bearings to overcome lateral thrusts accumulated by wheel flanges and car body sway, all as hereinafter more fully set forth and described in the accompanying specification and drawing.

The drawing shows a sectional elevation through an embodiment of the invention.

Referring to the drawing, A indicates a car wheel of conventional type and B an axle housing, which may be either connected to the wheel or cast integral therewith. In the embodiment illustrated a turned end 10 on the housing fits tightly within the hub 11 on the wheel. C indicates the axle made in one piece and formed adjacent the centre line 12 with shoulders 13 a short distance on each side of the centre line. The construction of the housing and of the axle is symmetrical on each side of the centre line, only one side being shown in the drawing. The axle can be arranged either to be rotating or non-rotating. The load is carried to the axle through a conventional journal box D of any convenient design having the usual journal bearing 14 with, if desired, an axle lock pin 15 engaging the groove 16 in the end of the axle. The axle can be either fixed as regards rotation to the journal box or free to rotate with respect to the same. A transfer of the load to the wheel is accomplished through roller bearings E and F, the roller bearing E being mounted within the turned end 10 of the housing B and consisting of rollers 15a mounted between sleeves 16a and 17 retained in a recess 18 in the housing by means of a bearing retainer plate 19 bolted in position, the outer end of which engages an annular flange 20 on an extension sleeve 21 shrunk on the axle and designed to form an oil and water seal. The inner race 17 is shrunk on the axle to prevent movement thereof.

The bearing F at the inner end of the sleeve-like extension is a radial thrust bearing having balls 22 held between rings 23 and 24 mounted in the annular groove 25, the ring 24 abutting the shoulder 13. Both rings are held in position by the thrust retainer plate 26 bolted to a flange 27 on the housing and having a short cylindrical extension 28 formed on the inside with a series of spaced grooves 29 designed to form a water seal about the axle. The radial thrust bearing F, in addition to carrying the light central load, maintains the housing and wheel true with the axle throughout the bearing and absorbs the lateral shocks against the shoulder 13. Any convenient form of lubrication may be used between the housing and the axle. As illustrated, a sleeve 31 is provided between the cylindrical portion of the housing and the axle and the housing is provided with a lubricating chamber 31a on the outer side of the sleeve which may be filled through a suitable plug 32 with oil or grease. The inner race 17 of the bearing E as well as the member 21 are shrunk on the axle in order that a proper seal may be obtained. The spacing sleeve 31 and the inner race 24 of the roller bearing has a slip fit, the spacer holding the race against the centre shoulder 13.

It will be seen that by the foregoing construction each of the wheels on the axle with its appropriate housing is free to turn independently so that a differential action with roller bearing support is obtained.

All of the various parts in operation are firmly held in position. The thrust bearing F seats against the shoulder 13 on axle C. Sleeve 31 holds the thrust bearing F against the shoulder 13. The inner race 17, being shrunk on the axle, is itself held in position and holds the sleeve 31 in position. The whole oil and water seal member 21, being shrunk on the axle, assists in preventing movement of all the above parts. In addition should movement outward take place, the oil and water seal member 21 would contact the bearing 14 in the journal box D and arrest further movement as the bearing 14 is anchored in position in the journal box D of the truck frame. None of these parts will normally rotate and the housing is held to centre through the wheel flange to which it is anchored through the wheel hub.

What I claim as my invention is:

1. A free wheeling axle and wheel support for railway vehicles comprising an axle having a shoulder on each side of the centre line thereof, axle housings having cylindrical portions fitted within the hubs of the wheels, roller bearings mounted within the said cylindrical portion, bearing retaining plates on the wheels for the said bearings, thrust ball bearings mounted in the housings at the inner end of the same, each ball bearing including an inner and outer race, the inner race abutting the shoulder on the axle, and a thrust retaining plate adapted to retain the races of the ball bearing in position.

2. The construction as claimed in claim 1 in which a spacing sleeve is provided between the housing and the axle and in which the housing has a lubricating chamber about the sleeve.

3. A free wheeling axle and wheel support for railway vehicles comprising an axle having a shoulder on each side of the centre line thereof, axle housings having cylindrical portions fitting within the hubs of the wheel, roller bearings mounted within the cylindrical portion having an inner and outer race, the inner race being shrunk to the axle bearing, retainer plates on the wheel for said bearings, an extension sleeve associated with the bearings having an annular flange engaging the bearing retainer plate and being shrunk on the axle, thrust ball bearing mounted in the housings in the inner end of the same, each ball bearing including an inner and outer race, the inner race abutting the shoulder on the axle, a thrust retaining plate adapted to retain the races of the ball bearings in position and sleeves mounted on the axle within the housings and abutting at opposite ends the inner races of the roller bearing and ball bearing.

4. The device as claimed in claim 3 in which the sleeve is mounted on the axle between the roller bearing and ball bearing and has a slip fit on the axle.

JOSEPH ASHMORE CAMERON.